June 30, 1964  R. R. BROWN  3,139,049
POWER DRIVEN ROTARY PLOW
Filed May 3, 1961  2 Sheets-Sheet 1

Roy R. Brown
INVENTOR.

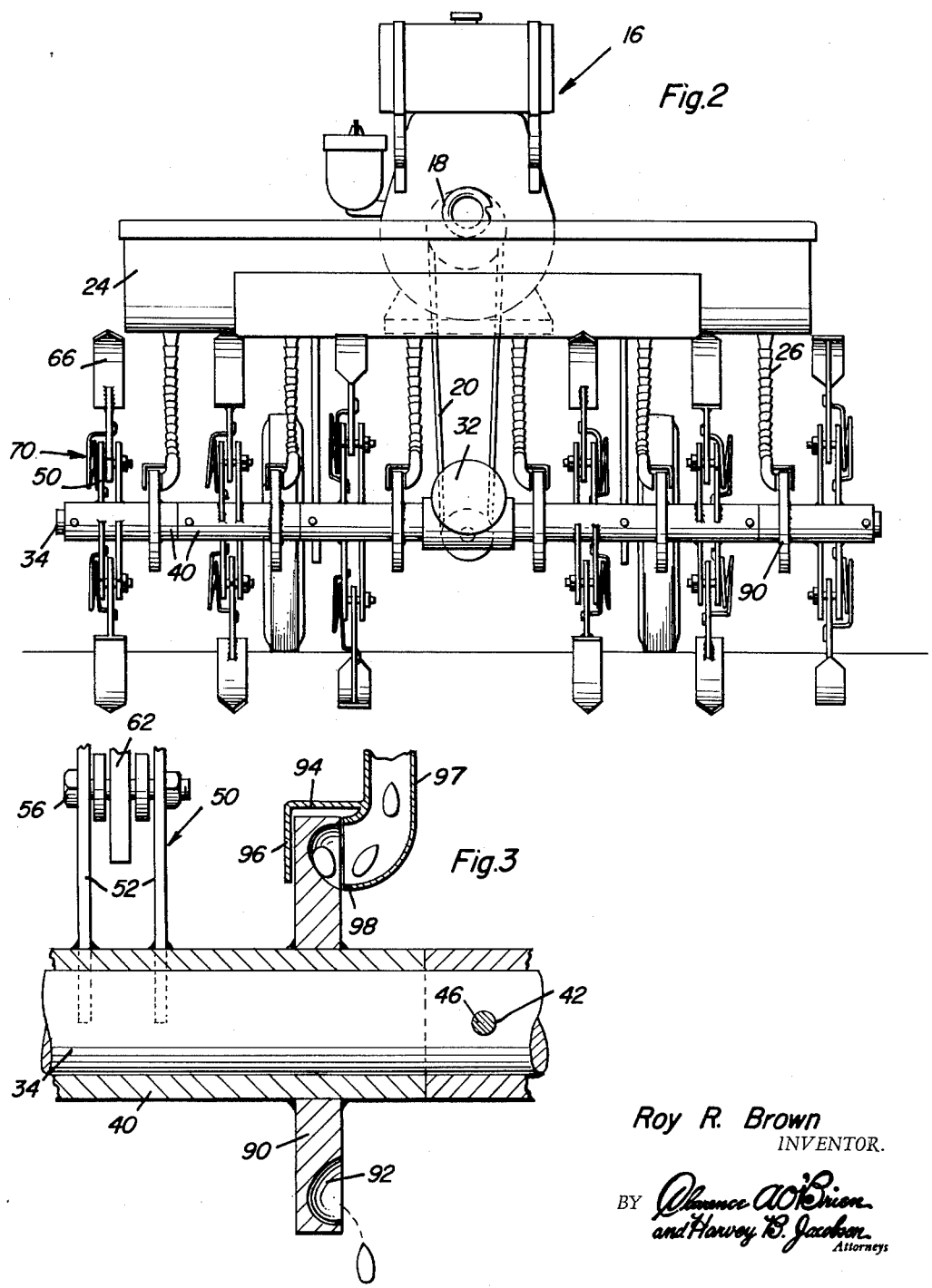

United States Patent Office 3,139,049
Patented June 30, 1964

3,139,049
POWER DRIVEN ROTARY PLOW
Roy R. Brown, Rte. 1, Mosheim, Tenn.
Filed May 3, 1961, Ser. No. 107,464
11 Claims. (Cl. 111—10)

This invention comprises a novel and useful power driven rotary plow and more particularly relates to a rotary plow having pivotally connected sectional blades.

The primary object of this invention is to provide a power operated rotary plow specifically adapted for easy handling by the individual and which will afford a very efficient and yet easily controlled plowing operation.

A further object of the invention is to provide a power driven rotary plow which although capable of being constructed in a wide range of sizes in order to perform plowing operations of different magnitudes, is especially adapted for manual operation for plowing by the individual.

A further object of the invention is to provide a rotary plow in accordance with the preceding objects wherein vibrations, shocks and jars normally encountered during the plowing operation and which are customarily transmitted through the handles of a plow to the user are reduced to a minimum.

A further object of the invention is to provide a rotary plow in accordance with the preceding objects which will enable the user to plow at a widely varied rate of travel ranging from a very slow movement to a rate of travel corresponding to the rapid walk of the individual while avoiding the uncomfortable and the sometimes agonizing wrench and jar to which rotary plows have heretofore customarily subjected the operator particularly when the plows encounter stones or other immovable objects during their use.

Still another purpose of the invention is to provide a rotary plow in which the peculiar construction of the plow blades affords a greatly superior breaking and turning of the soil, reduces to a minimum vibration and jars imparted to the user, protects the plow blades against breakage by encountering stones or other obstacles in the ground, and obtains a relatively increased rate of travel of the plow as compared to other types of plows after obstacles are encountered.

A still further important object of the invention is to provide a rotary plow construction in accordance with the foregoing objects which is also particularly well adapted to function as a means for supplying fertilizer and sowing seeds either alone or in conjunction with the plowing operation.

Yet another important object of the invention is to provide a rotary plow which is particularly well adapted for cultivating between standing rows of plants without injury to the latter.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of the plow of FIGURE 1 and showing the mounting of a plurality of rotary plow blades in side-by-side relation for simultaneous operation;

FIGURE 3 is an enlarged detail view in vertical section through a portion of the rotary axle of the plow and in particular illustrating the location thereon of one of the rotary plow blade elements and of a distributor for dispensing seed and/or fertilizer during the operation of the plow.

Figure 1:
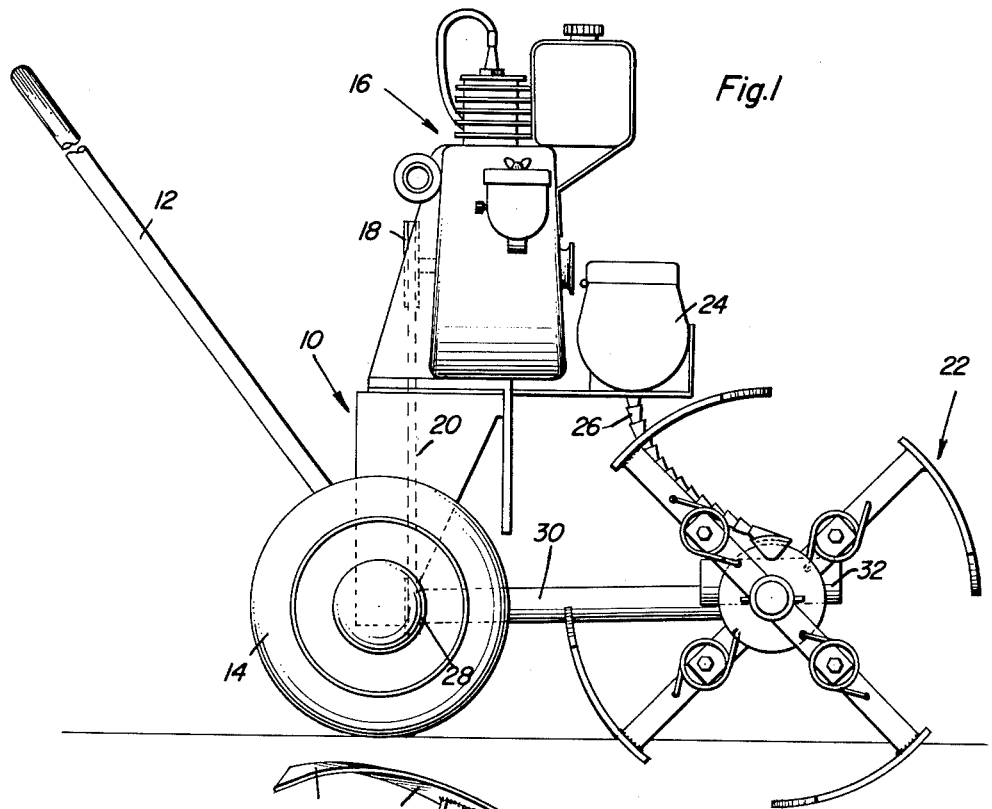
FIGURE 1 is a side elevational view showing a suitable and preferred form of power operated plow incorporating therein the principles of this invention.

Referring first to FIGURE 1 it will be seen that the form of rotary plow in which the principles of this invention are embodied consists of a supporting frame indicated generally by the numeral 10 and which may be provided with a handle 12 together with a pair of supporting wheels 14 secured to the frame whereby to render the latter readily movable and maneuverable by the operator. Mounted upon the frame is a source of power indicated generally by the numeral 16 and which may consist of an internal combustion engine having a power output member such as the pulley 18 which through a connecting means such as a belt indicated at 20 delivers power both to propel the frame over the ground and also to operate the rotary plow which is designated generally by the numeral 22.

Also mounted upon the frame 10 is a hopper or container 24, see also FIGURE 2, which through the use of flexible conduits as at 26 is utilized to deliver a material such as fertilizer, seeds or any other desired material for distributing by the machine as set forth hereinafter.

As suggested in FIGURES 1 and 2 in a somewhat schematic or diagrammatic manner, the driving belt 20 is connected to a driven pulley member 28 which is utilized to deliver power in any conventional manner, not shown, to the axle or shafts, not shown, to which the supporting wheels 14 are secured whereby to drive these wheels; and to further deliver power through a connecting shaft, not shown, disposed in a housing 30 which through a gearing connecting means, not shown, disposed in a housing 32 is employed to impart rotation to an axle 34 forming a part of the rotary plow assembly of the device.

Inasmuch as the actual structural details of the means for transmitting power between the power plant 16 and the propelling and supporting wheels 14 and/or the rotary plow 22 form no part of the invention claimed herein and may be of various suitable designs and constructions, to none of which the present invention is limited, it is deemed superfluous to illustrate the detailed construction thereof. It will of course be readily apparent that in accordance with conventional practice suitable clutches may be provided whereby the power may be selectively applied either to the propelling wheels 14, or to the rotary plow 22 alone or to both as desired.

Figure 4:
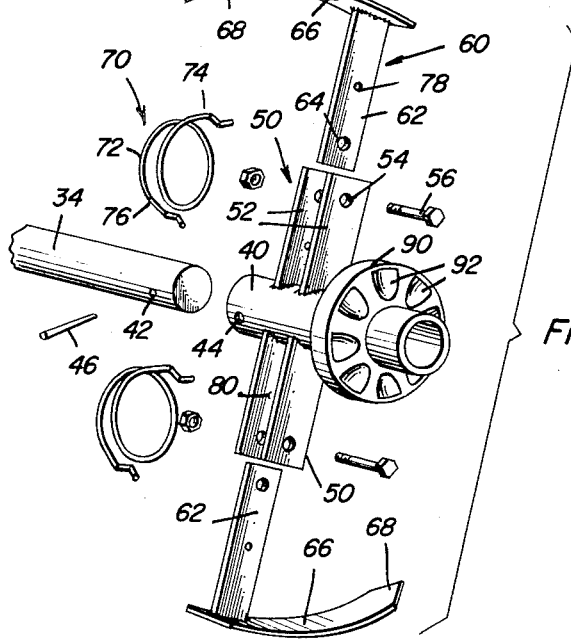
FIGURE 4 is an exploded perspective view of one of the rotary plow elements of the device.

A basic and fundamental feature of the present invention resides in the construction of the rotary plow 22 and of the novel and advantageous operation of the device obtained thereby. Reference is now made more specifically to FIGURES 3 and 4. As shown in FIGURE 3, the axle 34 which extends transversely of the line of travel of the device is of sufficient length to accommodate thereon any desired number of the rotary plow blade assemblies or plow elements. A preferred construction consists in the provision of a plurality of sleeves 40 each of which slidably embraces and is slidably received upon the axle 34 and with the sleeves being disposed in endwise relation and preferably in endwise abutting relation as shown clearly in FIGURE 2. For this purpose, the axle 34 is provided with a plurality of longitudinally spaced bores 42 extending diametrically therethrough and corresponding alignable bores 44 in each of the sleeves is adapted to receive a fastening means such as a pin 46 by which each sleeve may be releasably but fixedly secured to the axle for carrying thereby and for rotation therewith.

Rigidly secured to and projecting outwardly from each of the sleeves 40 are one or more pairs of arms each indicated generally by the numeral 50. These arms as shown in FIGURE 4 in particular may be welded to the sleeve and may extend in the interest of obtaining dynamic balancing, in diametrically opposed pairs therefrom. Any desired number of arms may be applied to each sleeve and if desired longitudinally spaced sets of arms may be employed upon the sleeve. The arms are preferably comprised of parallel plates 52 which are suitably apertured as at 54 for the reception of a pivot means in the form of a nut and bolt fastener 56. Pivotally connected to each of the arms 50 and retained between the parallel plates thereof is a plow blade, or plow element indicated generally by the numeral 60. Each of these members preferably comprises a plate-like shank 62 suitably apertured as at 64 with the shank being adapted to be received between the parallel plates 52 of an arm and with the pivot means 56 being received through the apertures 64 whereby to pivotally connect the plow element to its associated arm. The plow element in addition to the shank 62 has rigidly secured to its outer extremity a plowshare 66 which projects laterally from the shank and preferably is perpendicular thereto, but is provided with a curving extremity as at 68.

As thus far described it will now be apparent that each of the plow elements of the plow blade assembly consists of the rigid arm 52 projecting outwardly from its sleeve with a plow blade or plow element pivotally connected to and projecting outwardly from the end of the arm for pivoting movement circumferentially of the axle. A resilient means in the form of a spring indicated generally at 70 is provided consisting of a helical central coil portion 72 with oppositely projecting arms 74 and 76 thereon. The coil portion of this spring is adapted to be disposed adjacent the pivots as shown in FIGURE 2, with the two arms being respectively connected to the plow elements or plow blades as by engagement in an aperture 78 in a shank 62 and through a corresponding aperture 80 in the associated arm in one plate thereof. The springs tend to yieldingly and resiliently urge the plow blade or plow element into a predetermined angular disposition with respect to the associated arm, as for example with the shank aligned with its associated arm.

It will be understood that in some instances it may be preferred to position the spring between the pair of plates 52 in which case the coil portion 72 could conveniently encircle the pivot 56, so that the entire spring, except for the arm 74 which extends outwardly from the arm and is connected in the aperture 78 of the shank 62 would be housed between the plates of the associated arm.

In the operation of the device as so far described it will be understood that when power is applied to the axle 34, the blade assemblies mounted thereon will rotate therewith and centrifugal force aided by the springs will normally retain the arms and the shanks of the blade assemblies in aligned position as shown in FIGURE 1. In this position, each time the blade encounters an obstacle it will tend to flex or pivot backwardly with respect to the direction of rotation of the axle about its pivot means. This will serve the plural functions of allowing the plowshare of the blade to yield when it encounters an obstacle such as a stone or the like so as to thereby prevent unnecessary damage to the blade, and also and more important it will serve to cushion the device so as to prevent the transmission of jars and shocks to the user. In addition, this yielding action will permit the individual blades to yield when they encounter an obstacle but thereafter to again extend themselves so as to avoid, evade and pass around the obstacle during continued rotation of the axle.

The cushioning operation of the plow blade assembly is very important in that it removes a primary source of discomfort which attends previous forms of rotary plows. When the user grasps the handle 12 and is guiding or maneuvering the plow during either plowing operations for preparing unbroken soil, for re-working the soil for various purposes and the like, it is evident that the rapid repeated succession of impacts of the blades upon hard ground, or upon obstacles encountered during their rotation will in turn impart a wrenching and often agonizing vibration and jarring to the user which greatly interferes with precise control of the travel and operation of the device. In the present instance this is largely avoided since the yielding of the blades is such that substantially no jarring, vibration or shock is transmitted to the user.

It should be noted that even when a blade strikes merely normal soil, the increased resistance to passage of the blade therethrough of this device will cause a flexing or pivoting of the blade which not only obtains the above-mentioned desired reduction in jarring and shocking to the user, but through pivoting of the blade on the arm will tend to reduce the length of the rate as to which the blade is traveling in its rotation thereby obtaining an amplified mechanical force applied from the sleeve to the blade.

This operation will be readily apparent from a consideration of the showing of FIGURE 1. As a blade strikes the ground, it will tend to pivot backwardly about its pivot with respect to the direction of rotation of the blade and shaft. This will reduce the distance of the blade from the axis of rotation so that the pivot will tend to pull the blade through the soil and to do so through a shorter lever arm. This will somewhat reduce the rate of travel of the blade through the soil obtaining a smoother operation, less vibration and greater useful torque or force applied to the blade itself. As the blade emerges from the soil, aided by both the spring and its centrifugal force, it will tend to straighten out so that it travels in a circle of maximum diameter thereby obtaining the maximum momentum in preparation for its next penetration into the soil.

It will be understood that the tension of the springs will be particularly selected to effect this desired novel yielding operation of the blade during its rotation and during its plowing operation.

As previously mentioned, each of the sleeves 40 contains at least one of the blade elements thereon. In addition, as shown in FIGURES 2 and 3, each sleeve also has secured thereto a distributing disc 90 which may be welded to the sleeve as shown. This distributing disc, see also FIGURE 4, upon at least one face thereof has a plurality of distributing chambers, pockets or recesses as at 92 which are disposed circumferentially of the space adjacent its periphery. An arcuately extending guard in the form of a laterally extending plate or flange 94 having a downturned flange 96 is adapted to overlie in close association at least a portion of the uppermost part of the periphery of the distributing disc 90. The flange 94 is connected to the lowermost or discharge end and nozzle portion 97 of the previously mentioned flexible conduits 26 with the discharge orifice 98 of the nozzle end being disposed in close registration with the cavities or distributing chambers 92 as the latter successively pass adjacent thereto. This operation is shown in FIGURE 3 and it will be readily understood that any suitable material such as fertilizer, seeds or the like carried by the hopper or container 24 will be delivered by the flexible conduit 26 to each of the distributing discs 90 and will then be in turn discharged therefrom into the soil.

Obviously any suitable means may be provided for controlling the rate of flow from zero to a maximum from the container or tank 24 to the distributing discs.

By this arrangement, each sleeve serves as a unit carrying one or more distributing discs and one or more of the plow blade assemblies, and the capacity of the machine may thus be selectively increased or varied as desired by the addition of or the removal of sleeves and their associated structure from the axle.

Although for convenience of illustration FIGURE 3 illustrates the distributing chambers 92 as being formed on one face only of the discs 90, it will be understood that these may be provided upon both faces thereof if desired. Further, the guard member consisting of the plates 94 and 96 is rigidly attached to the discharge nozzle 97 and serves not only to steady and support the latter which is carried by the lower end of the flexible conduit 26, but also serves to insure registration of the nozzle orifice 98 with the distributing chambers 92.

As illustrated, each of the sleeves is individually fastened to the axle. It is however possible to omit certain of these fasteners in the event that the sleeves are connected to each other as by a sufficiently tight endwise abutting engagement or other suitable means so as to insure the rotation of these sleeves with their axle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power operated rotary plow comprising a supporting frame, a rotary plow blade assembly journaled on said frame, a source of power on said frame connected to said plow blade assembly for rotating the latter, said assembly including an axle on said frame extending transversely of the line of travel of the latter, sleeves removably received in end to end relation on said axle, means fixedly securing said sleeves to said axle for rotation therewith, outwardly projecting arms fixed to each sleeve for rotation therewith about an axis transverse to said line of travel, a plow blade for each arm having an elongated shank, a pivot means securing each plow blade shank to and within an arm for pivotal movement thereon in the plane of rotation of said arm, resilient means each connected to a plow blade shank and to the associated arm and yieldingly urging said blade into a predetermined angular disposition relative to its arm, a plurality of longitudinally spaced distributing disks fixedly secured to said axle each adjacent one of said plow blades for rotation with said axle, distributing chambers disposed in circumferentially spaced relation at the periphery on one side face of said disks, means on said frame feeding a material to be distributed to said chambers.

2. A power operated rotary plow comprising a supporting frame, a rotary plow blade assembly journaled on said frame, a source of power on said frame connected to said plow blade assembly for rotating the latter, said assembly including an axle on said frame extending transversely of the line of travel of the latter, sleeves removably received in end to end relation on said axle, means fixedly securing said sleeves to said axle for rotation therewith, outwardly projecting arms fixed to each sleeve for rotation therewith about an axis transverse to said line of travel, a plow blade for each arm having an elongated shank, a pivot means securing each plow blade shank to and within an arm for pivotal movement thereon in the plane of rotation of said arm, resilient means each connected to a plow blade shank and to the associated arm and yieldingly urging said blade into a predetermined angular disposition relative to its arm, a plurality of longitudinally spaced distributing disks fixedly secured to said axle each adjacent one of said plow blades for rotation with said axle, distributing chambers disposed in circumferentially spaced relation at the periphery on one side face of said disks, means on said frame feeding material to be distributed to said chambers, each sleeve having a plow blade and a distributing disk mounted thereon in spaced side by side relation.

3. The combination of claim 2 including housings each connected to and communicating with said feeding means and partially embracing the upper portion of an associated disk and communicating said feeding means successively with said chambers.

4. The combination of claim 3 wherein said housing includes a nozzle disposed with its discharge orifice in close relation to the associated disk and discharging material solely into said chambers.

5. The combination of claim 4 wherein said housing includes a flange disposed in closely spaced relation to the opposite side of the disk from its chambers.

6. The combination of claim 5 wherein said housing includes a second flange extending circumferentially of the upper portion of the periphery of the associated disk.

7. The combination of claim 6 wherein said feeding means includes a hopper, conduits each extending from said hopper to one of said disks, said housings being each supported and carried solely by one of said conduits through said second flange.

8. A power operated rotary plow comprising a supporting frame, a rotary plow blade assembly journaled on said frame, a source of power on said frame connected to said plow blade assembly for rotating the latter, said assembly including an axle on said frame extending transversely of the line of travel of the latter, sleeves removably received in end to end relation on said axle, means fixedly securing said sleeves to said axle for rotation therewith, outwardly projecting arms fixed to each sleeve for rotation therewith about an axis transverse to said line of travel, a plow blade for each arm having an elongated shank, a pivot means securing each plow blade shank to and within an arm for pivotal movement thereon in the plane of rotation of said arm, resilient means each connected to a plow blade shank and to the associated arm and yieldingly urging said blade into a predetermined angular disposition relative to its arm, a plurality of longitudinally spaced distributing disks fixedly secured to said axle each adjacent one of said plow blades for rotation with said axle, distributing chambers disposed in circumferentially spaced relation at the periphery on one side face of said disks, means on said frame feeding a material to be distributed to said chambers, said feeding means including a hopper, conduits each communicating said hopper with one of said disks, housings each supported solely by one of said conduits and partially embracing the upper peripheral portion of a disk and communicating sequentially with said chambers.

9. The combination of claim 8 wherein said housing includes a nozzle disposed with its discharge nozzle in close relation to said disk preventing discharge of material from said nozzle except into said chambers when the latter register with said nozzle.

10. The combination of claim 9 wherein said housing includes a flange disposed in closely spaced side by side relation with the other side of said disk from said chambers.

11. The combination of claim 10 wherein said housing further includes a second flange extending circumferentially of the periphery of said disk, said second flange comprising the sole means supporting said housing upon said conduit.

References Cited in the file of this patent
UNITED STATES PATENTS

| | | |
|---|---|---|
| 354,513 | Lubin | Dec. 14, 1886 |
| 437,872 | Stone | Oct. 7, 1890 |
| 460,880 | Montecino | Oct. 6, 1891 |
| 567,622 | Stephens | Sept. 15, 1896 |

(Other references on following page)

UNITED STATES PATENTS

| | | |
|---|---|---|
| 764,365 | Mercer | July 5, 1904 |
| 972,332 | Carter | Oct. 11, 1910 |
| 977,162 | Briscoe | Nov. 29, 1910 |
| 1,542,963 | Russell | June 23, 1925 |
| 2,143,648 | Coutchure | Jan. 10, 1939 |
| 2,203,771 | Bennett | June 11, 1940 |
| 2,250,391 | Ober | July 22, 1941 |
| 2,690,145 | Romain | Sept. 28, 1954 |
| 2,742,840 | Servais | Apr. 24, 1956 |
| 2,795,176 | O'Hara | June 11, 1957 |
| 2,847,924 | Quick | Aug. 19, 1958 |
| 2,990,186 | Gandrud | June 27, 1961 |
| 3,053,418 | Jordan | Sept. 11, 1962 |

FOREIGN PATENTS

| | | |
|---|---|---|
| 251,388 | Germany | Oct. 2, 1912 |
| 824,744 | Great Britain | Dec. 2, 1959 |